(12) United States Patent
Henn et al.

(10) Patent No.: US 7,380,401 B2
(45) Date of Patent: Jun. 3, 2008

(54) METHOD FOR MONITORING THE SPEED OF A BI-TURBOCHARGER

(75) Inventors: Michael Henn, Lehre (DE); Franz Kunz, Tegernheim (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 10/555,969

(22) PCT Filed: Apr. 28, 2004

(86) PCT No.: PCT/EP2004/050630

§ 371 (c)(1),
(2), (4) Date: Nov. 8, 2005

(87) PCT Pub. No.: WO2004/099585

PCT Pub. Date: Nov. 18, 2004

(65) Prior Publication Data

US 2006/0260306 A1    Nov. 23, 2006

(30) Foreign Application Priority Data

May 9, 2003    (DE) .............................. 103 20 977

(51) Int. Cl.
*F02B 33/44* (2006.01)
(52) U.S. Cl. .......................... 60/612; 60/611
(58) Field of Classification Search .............. 60/60, 60/612
See application file for complete search history.

(56) References Cited

U.S. PATENT DOCUMENTS

| | | | |
|---|---|---|---|
| 5,845,495 A * | 12/1998 | Schray et al. .................. | 60/612 |
| 6,050,250 A | 4/2000 | Kerkau | |
| 6,202,415 B1 | 3/2001 | Lohmann et al. | |
| 6,253,551 B1 * | 7/2001 | Lohmann et al. ............. | 60/602 |
| 6,256,992 B1 | 7/2001 | Lewis, Jr. et al. | |
| 6,397,597 B1 * | 6/2002 | Gartner ..................... | 60/605.2 |
| 6,574,961 B2 * | 6/2003 | Shiraishi et al. .............. | 60/602 |
| 6,601,388 B1 * | 8/2003 | Gladden ...................... | 60/606 |
| 2003/0101723 A1 * | 6/2003 | Birkner et al. ................ | 60/602 |

FOREIGN PATENT DOCUMENTS

| | | |
|---|---|---|
| DE | 199 24 274 A1 | 12/1999 |
| EP | 0 856 097 B1 | 8/1998 |
| EP | 0 894 958 A2 | 2/1999 |
| EP | 0 972 926 A2 | 1/2000 |

* cited by examiner

*Primary Examiner*—Thomas Denion
*Assistant Examiner*—Douglas J. Duff (57) ABSTRACT

A method and a device for monitoring a rotational speed of a first charger for an internal combustion engine, especially an exhaust gas turbocharger, are provided. A first exhaust value representing an exhaust gas composition of the internal combustion engine in a first exhaust section is defined, and a first speed value representing the rotational speed of the first charger is determined according to the defined first exhaust value. The first exhaust value is regulated to a predefined first reference value using a first correcting variable which is ascertained as required for regulation. The first rotational speed value is determined depending on the first correcting variable.

9 Claims, 5 Drawing Sheets

METHOD FOR MONITORING THE SPEED OF A BI-TURBOCHARGER

CROSS REFERENCE TO RELATED APPLICATION

This application is the U.S. National Stage of International Application No. PCT/EP2004/050630, filed Apr. 28, 2004 and claims the benefit thereof. The International Application claims the benefits of German Patent application No. 103 20 977.8 DE filed May 9, 2003, both of the applications are incorporated by reference herein in their entirety.

FIELD OF THE INVENTION

The invention relates to a method and a device for monitoring the rotational speed of a bi-turbocharger for an internal combustion engine.

BACKGROUND OF THE INVENTION

Internal combustion engines having two separate banks of cylinders are known, where in each case an exhaust gas turbocharger is assigned to each cylinder bank. The two exhaust gas turbochargers consist in each case of an exhaust turbine located in the exhaust section of the two cylinder banks and a compressor which is located in the intake section of the two cylinder banks and increases the charging pressure.

In the event of a blockage affecting a bi-turbocharger of such a type the drive power converted at the compressor in question is reduced. The reason for this is the fact that the blockage results in a reduction of the volume flow, as a result of which the charging pressure of the exhaust gas turbocharger in question decreases. In the case of such a single-sided drop in power affecting the bi-turbocharger, the other exhaust gas turbocharger will deliver a correspondingly greater volume flow in this situation, which can lead to mechanical overloading as a result of the increased rotational speed of the exhaust gas turbocharger which is functioning correctly. It is therefore important in the case of a bi-turbocharger that deviations in rotational speed between the two exhaust gas turbochargers due to malfunctions are detected in good time in order to prevent damage to the fault-free exhaust gas turbocharger caused by excessive rotational speeds.

A method is known from EP 0 856 097 B1 for detecting differences in rotational speed between the two exhaust gas turbochargers of a bi-turbocharger. To this end, a pressure sensor is located in the exhaust section of each of the two cylinder banks, which measures the exhaust pressure. It is then possible to infer the difference in rotational speed of the two exhaust gas turbochargers from the difference between the two exhaust pressures. In this situation, it is assumed that the difference in pressure between the two cylinder banks of the internal combustion engine increases with the difference in rotational speed. If the difference in rotational speed between the two exhaust gas turbochargers exceeds a predefined maximum value over a specific period of time, protective measures are initiated which are intended to prevent any damage occurring. For example, in such an instance a bypass valve (waste gate) can be opened which bypasses the exhaust gas turbine of the exhaust gas turbocharger which is functioning correctly and thereby reduces its power.

The disadvantage of the known method described above for monitoring the rotational speed of a bi-turbocharger is the fact that a pressure sensor is required in the exhaust section of each of the two cylinder banks.

SUMMARY OF THE INVENTION

The object of the invention is therefore to set down a method for monitoring the rotational speed of a bi-turbocharger which does not require a pressure sensor in the exhaust section of the two cylinder banks.

This object is achieved by a method and a corresponding device in accordance with the claims.

The invention incorporates the general technical teaching of evaluating the exhaust gas composition of an internal combustion engine in order to determine the rotational speed of a charger.

The air/fuel ratio which is represented by the so-called air ratio is preferably determined within the framework of the method according to the invention. The air ratio is therefore preferably measured in the exhaust section of the internal combustion engine in order to ascertain the rotational speed of the charge depending on the measured air ratio. This can be achieved in a simple manner because in the case of modern internal combustion engines having a regulated exhaust catalytic converter each cylinder bank in any case has a lambda probe which is located in the exhaust section of the internal combustion engine and measures the air ratio of the exhaust gas.

The concept of an exhaust value used within the framework of the invention should however be understood in a general context and not restricted to the air ratio in the exhaust gas of the internal combustion engine. It is in principle also conceivable when determining the rotational speed of the charger to take exhaust values other than or in addition to the air ratio into consideration as characteristic values in the exhaust section.

Furthermore, the method according to the invention for monitoring the rotational speed of a bi-turbocharger is suitable not only for exhaust gas turbochargers but also for other charger types.

In addition, within the framework of the invention it is not necessary for the exhaust value used for calculating the rotational speed to be measured directly by means of an exhaust gas probe. Rather, it is also possible for the exhaust value of interest to be derived from other operational variables of the internal combustion engine.

In a preferred embodiment of the method according to the invention, in the case of an internal combustion engine having two cylinder banks an exhaust value is determined in each case in the exhaust section of each cylinder bank, whereby a charger rotational speed value is determined in each case depending on the exhaust values of the individual cylinder banks.

The rotational speed values of the individual cylinder banks can then be compared with one another in order to detect a fault which may be caused for example by a blockage in one of the two compressors.

Depending on the comparison of the two rotational speed values, protective measures can then be initiated such as are described for example in publication EP 0 856 097 B1 mentioned at the beginning, with the result that the content of the latter publication should be added to the present description in respect of the possible protective measures.

Thus, in the case of a large difference in rotational speed between the two exhaust gas turbochargers, it is for example possible to open a bypass valve (waste gate) which bypasses the exhaust gas turbine of the exhaust gas turbocharger which is functioning correctly and thereby reduces its power in order to prevent an overload situation.

A further protective measure consists in performing a cylinder-selective injection masking process. Such an injection masking process actually serves to dilute the exhaust gas with fresh gas, as a result of which the enthalpy of the exhaust gas is reduced. By this means, the load level on the internal combustion engine is forced down and the required charging pressure is regulated downward accordingly. The danger therefore no longer exists of one of the exhaust gas turbochargers entering an excessive rotational speed range.

The further possible protective measure exists of limiting the maximum opening of the throttle valve in order to prevent any overloading of an exhaust gas turbocharger in the event of a fault.

Each of these protective measures can be implemented individually or in combination with other protective measures, whereby an individual maximum value for the permissible rotational speed difference between the two exhaust gas turbochargers can be defined for each protective measure.

In a preferred embodiment of the method according to the invention the rotational speed of the exhaust gas turbocharger in question is however determined not only depending on the exhaust value described above (the air ratio in the exhaust gas, for example) but also depending on at least one further operational variable of the internal combustion engine or of the exhaust gas turbocharger.

For example, the temperature in the intake section of the internal combustion engine can be determined and taken into consideration when quantifying the rotational speed value for the respective exhaust gas turbocharger. To this end, a temperature sensor is preferably used which measures a corresponding temperature value in the intake section of the internal combustion engine, whereby the temperature sensor can be located at almost any position in the intake section.

For example, the temperature sensor can be located upstream of the throttle valve or downstream of the throttle valve.

If a charge air cooler is used in the intake section of the internal combustion engine, the temperature sensor can optionally be located upstream of the charge air cooler or downstream of the charging air cooler.

The option also exists of locating the temperature sensor upstream of the compressor or downstream of the compressor.

It should also be mentioned that the intake sections of the individual cylinder banks can be combined downstream of the compressors. The temperature sensor can then be located optionally in the separate branches of the intake section or in the combined area of the intake section.

The possibility also exists of combining the intake sections of the individual cylinder banks upstream of the individual compressors. In such a case, it is possible on the one hand for a temperature sensor to be located in each branch of the intake section upstream of the compressor in each case. On the other hand, a single temperature sensor can be provided in the combined intake area upstream of the two compressors.

With regard to combined intake sections, one throttle valve can be located in each intake section. As an alternative, however, it is also possible for a common throttle valve to be located in the combined area of the intake section.

By preference, the determination of the rotational speed of the exhaust gas turbocharger is carried out depending not only on the exhaust value (for example air ratio in the exhaust gas) and/or the temperature in the intake section but also depending on pressure values in the intake section.

In a preferred embodiment of the invention the pressure is therefore measured in the intake section upstream of the compressor and/or downstream of the compressor, whereby the rotational speed is determined depending on the measured pressure values.

In this situation, the pressure measurement is preferably performed by means of pressure sensors, whereby the pressure sensors can be located in an area in which the intake sections of a plurality of cylinder banks are combined. As an alternative, however, it is also possible for the pressure sensors each to be located in separate branches for each cylinder bank.

Furthermore, when determining the charger rotational speed it is also possible to take into consideration the pressure in the exhaust section of the internal combustion engine. By preference, therefore, a pressure sensor is located in each exhaust section which measures the exhaust pressure in the exhaust sections of the individual cylinder banks. If the exhaust sections of a plurality of cylinder banks are combined, then a common pressure sensor can be located in the combined area.

In the preferred embodiment of the invention, in order to determine the rotational speed of the charger the lambda regulation process is utilized which regulates the air ratio of the internal combustion engine to a predefined reference value that can be defined for example by means of the so-called catalytic converter window. Depending on the difference between the predefined reference value for the air ratio and the measured actual value for the air ratio a correcting variable is then determined which acts on the internal combustion engine or the injection system and thereby regulates the difference between reference and actual values for the air ratio. In this situation, the exhaust mass flow can be derived from the correcting variable required for regulating the difference between reference and actual values for the air ratio. The associated rotational speed of the relevant turbocharger can then be ascertained according to a turbocharger rotational speed model from the exhaust mass flow ascertained in this way and from further operational variables for the internal combustion engine or the injection system.

In a preferred embodiment of the invention the turbocharger rotational speed is read out from a multi-dimensional characteristic field depending on the air mass flow, the temperature in the intake section of the internal combustion engine, the exhaust gas pressure upstream of the compressor and the exhaust gas pressure downstream of the compressor.

BRIEF DESCRIPTION OF THE DRAWINGS

Other advantageous developments of the invention are set down in the subclaims or are described in detail in the following together with the description of the preferred embodiments of the invention with reference to the figures. In the drawings:

DETAILED DESCRIPTION OF THE INVENTION

Figure 1:
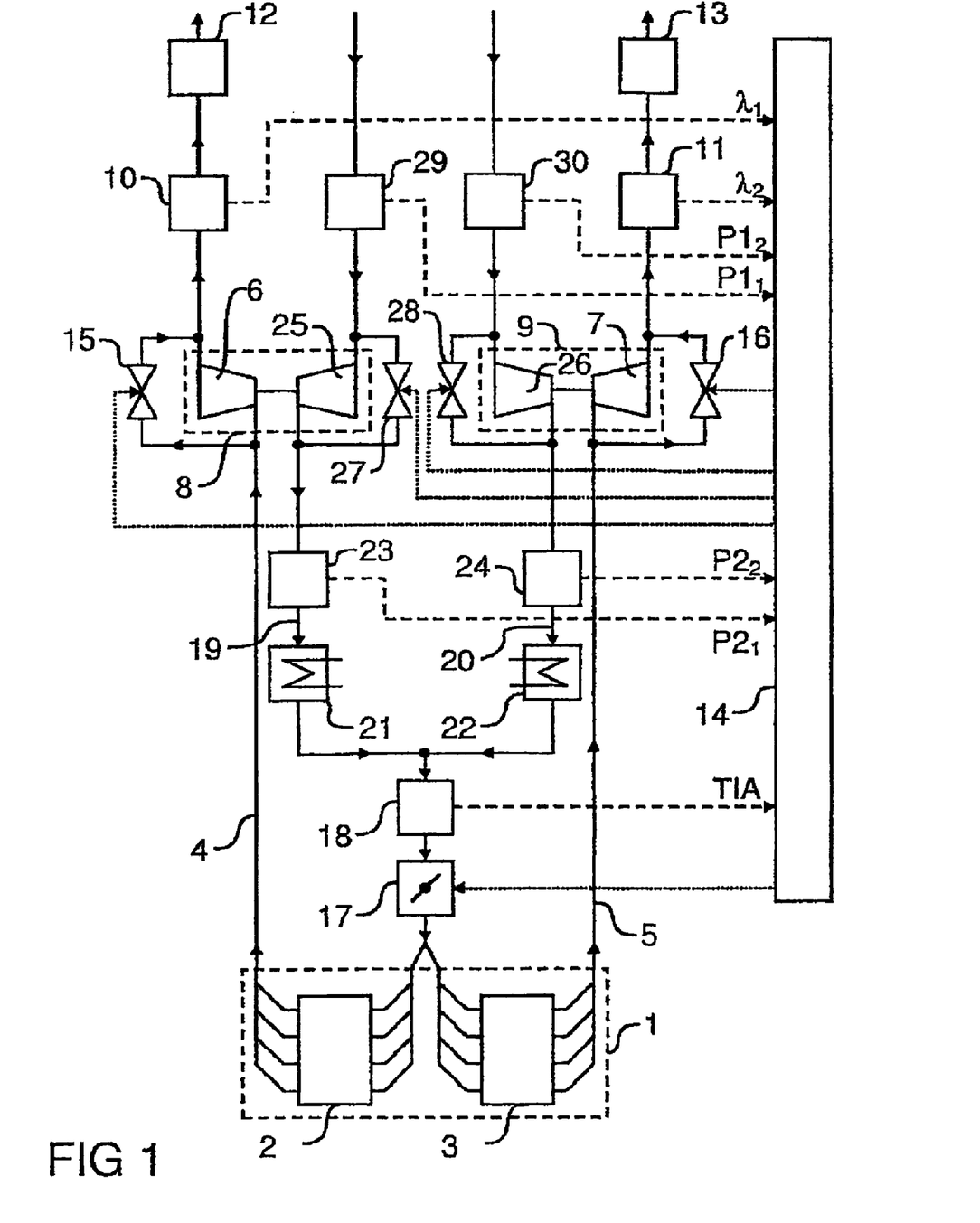
FIG. 1 shows an internal combustion engine having two cylinder banks and eight cylinders and also a bi-turbocharger.

In the following, the structure of the bi-turbocharger arrangement shown in FIG. 1 is described initially in order to subsequently describe the method according to the invention with reference to the control engineering equivalent circuit diagram shown in FIG. 2 and the flowchart shown in FIGS. 3a to 3c.

FIG. 1 shows an internal combustion engine 1 with two cylinder banks 2, 3 each having four cylinders. Within the framework of the invention it is however also possible for each of the two cylinder banks 2, 3 to have a different number of cylinders. Each of the two cylinder banks 2, 3 can thus, for example in the case of a 6-cylinder engine, have three cylinders.

For each of the two cylinder banks 2, 3 the internal combustion engine 1 has a separate exhaust section 4, 5, whereby the exhaust section 4 is connected to an exhaust turbine 6 of an exhaust gas turbocharger 8, while the exhaust section 5 is connected to an exhaust turbine 7 of an exhaust gas turbocharger 9.

Located downstream of the exhaust turbines 6, 7 in each case is a lambda probe 10, 11 and also an exhaust catalytic converter 12, 13, whereby the lambda probes 10, 11 measure the air ratio $\lambda_1$, $\lambda_2$ in the exhaust sections 4, 5 and deliver it to a control unit 14.

In addition, parallel to the exhaust turbines 6, 7 in each case is located a bypass valve 15, 16 which is driven by the control unit 14 and allows bypassing of the exhaust turbines 6, 7.

The intake sections of the two cylinder banks 2, 3 of the internal combustion engine 1 are initially combined, whereby the intake air feed to the internal combustion engine 1 is adjusted by a throttle valve 17 which is driven by the control unit 14.

Located upstream of the throttle valve 17 in the intake section of the internal combustion engine 1 is a temperature sensor 18 which measures the intake air temperature and delivers a corresponding temperature signal TIA to the control unit 14.

The intake air section of the internal combustion engine 1 branches upstream of the temperature sensor 18 into two branches 19, 20, whereby a charging air cooler 21, 22 is located in each of the two branches 19, 20.

Upstream of each of the charging air coolers 21, 22 is situated a pressure sensor 23, 24, whereby the two pressure sensors 23, 24 measure the charging pressure $P2_1$ and $P2_2$ respectively in the two branches 19, 20 and deliver the measurements to the control unit 14. As an alternative, however, it is also possible for only a single pressure sensor to be located in the intake section of the internal combustion engine 1, which is situated in the area in which the intake sections 19, 20 of the two cylinder banks 2, 3 are combined.

In addition, a compressor 25, 26 is situated in each of the respective branches 19, 20, whereby the compressors 25, 26 are driven by the exhaust turbines 6, 7 and increase the charging pressure.

A bypass valve 27, 28 is located parallel to each of the respective compressors 25, 26, whereby the two bypass valves 27, 28 are driven by the control unit 14 and allow bypassing of the compressors 25, 26. As an alternative, however, it is also possible for the two bypass valves 27, 28 to be driven mechanically, for which purpose for example a spring can be used.

A pressure sensor 29, 30 is located upstream of each of the two compressors 25, 26 in the two branches 19, 20, whereby the two pressure sensors 29, 30 measure the pressure $P1_1$, $P1_2$ upstream of the two compressors 25, 26.

The method according to the invention is now described in detail in the following with reference to the control engineering equivalent circuit diagram shown in FIG. 2 and the flowchart shown in FIGS. 3a to 3c.

Figure 2:
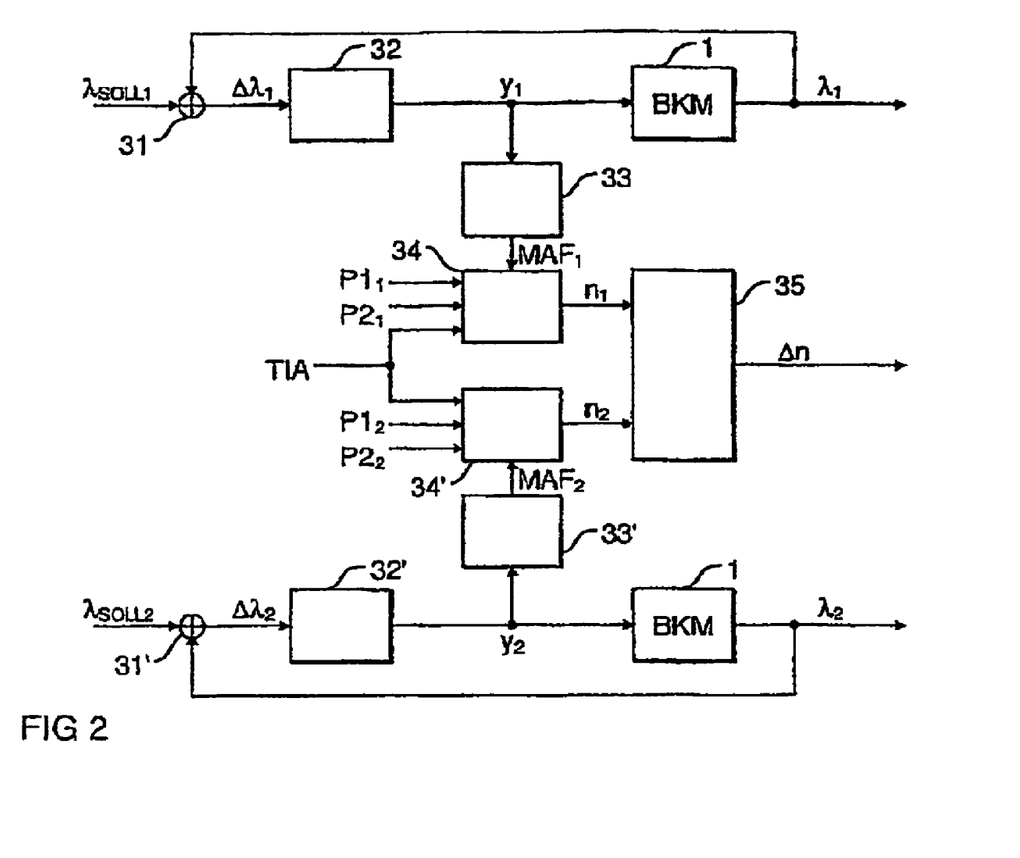
FIG. 2 shows a simplified control engineering equivalent circuit diagram for the method according to the invention.
Figure 3A:
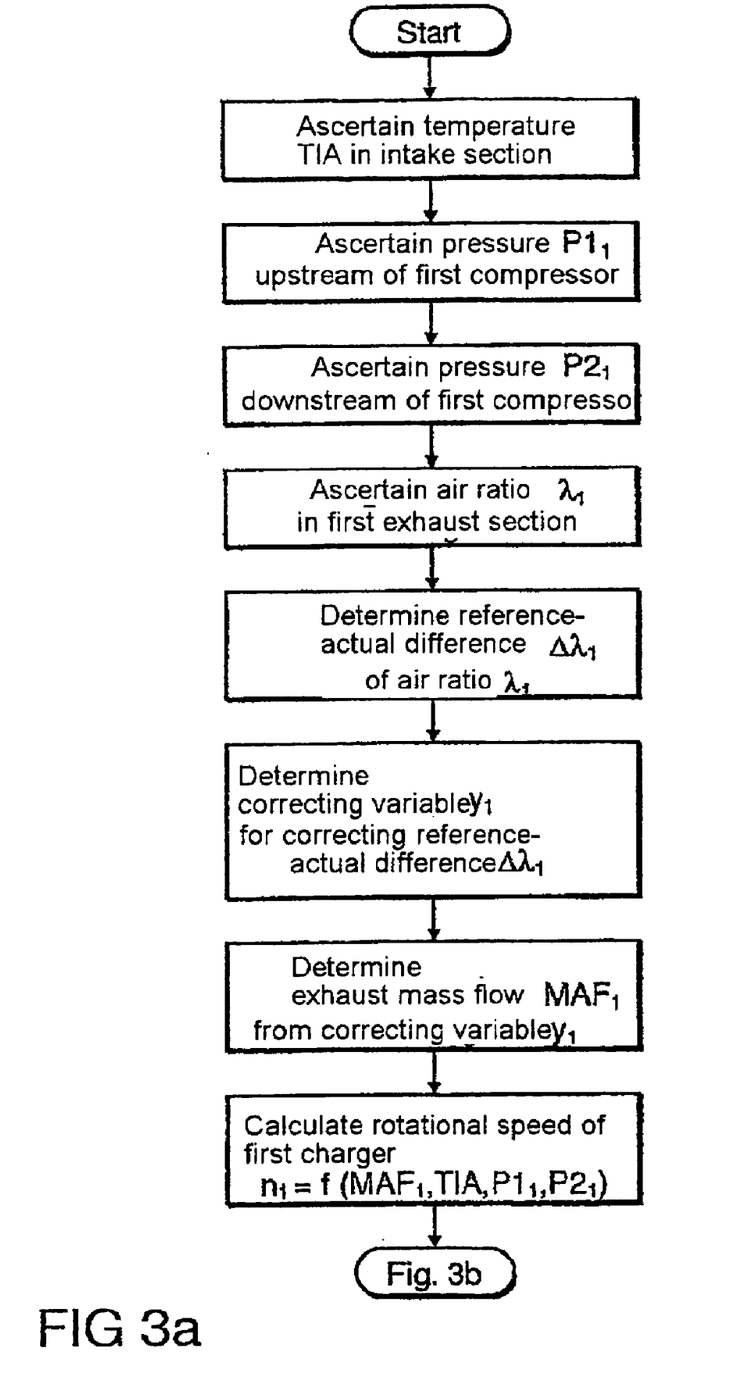
FIGS. 3a-3c show the method according to the invention for monitoring the rotational speed of the bi-turbocharger from FIG. 1 in the form of a flowchart.
Figure 3B:
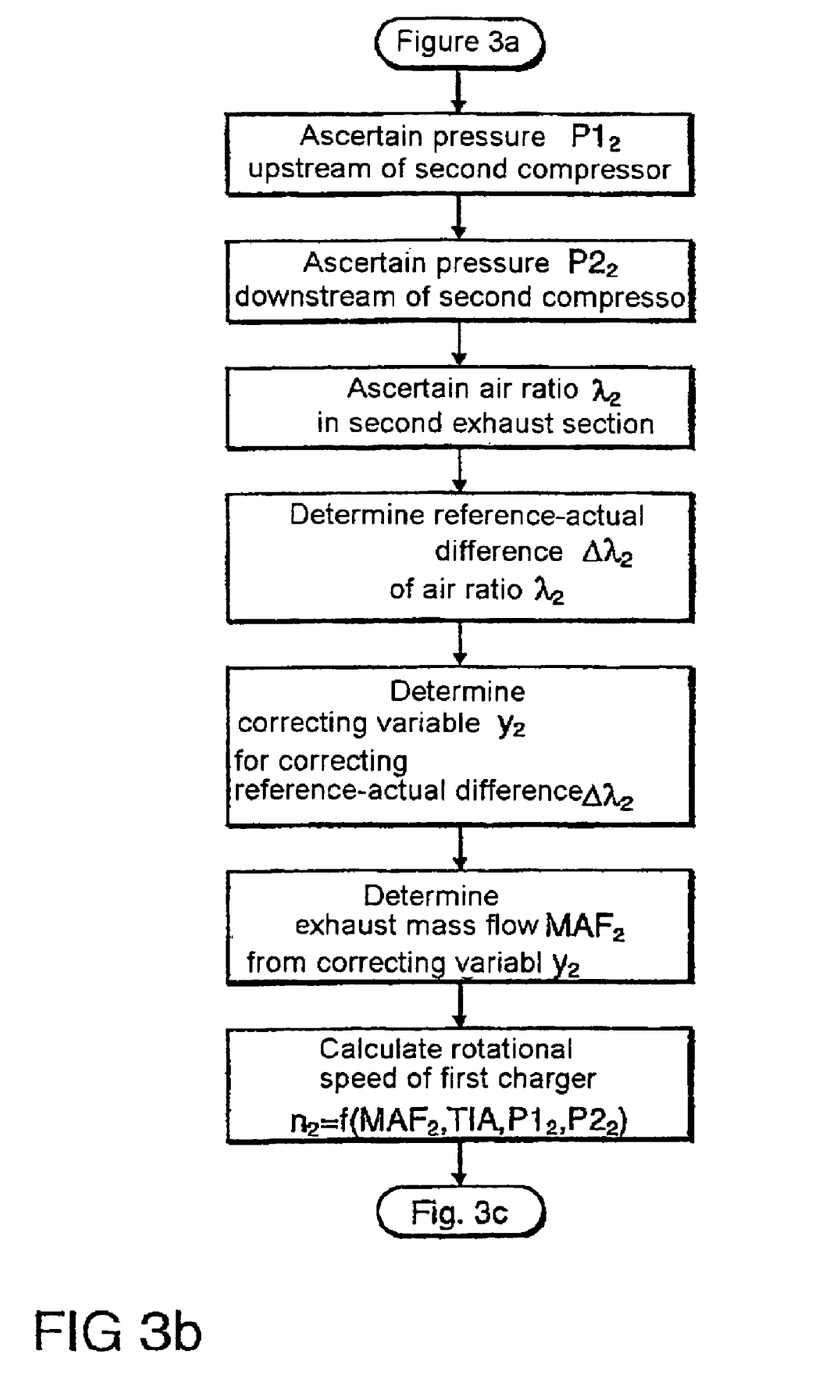
Figure 3C:
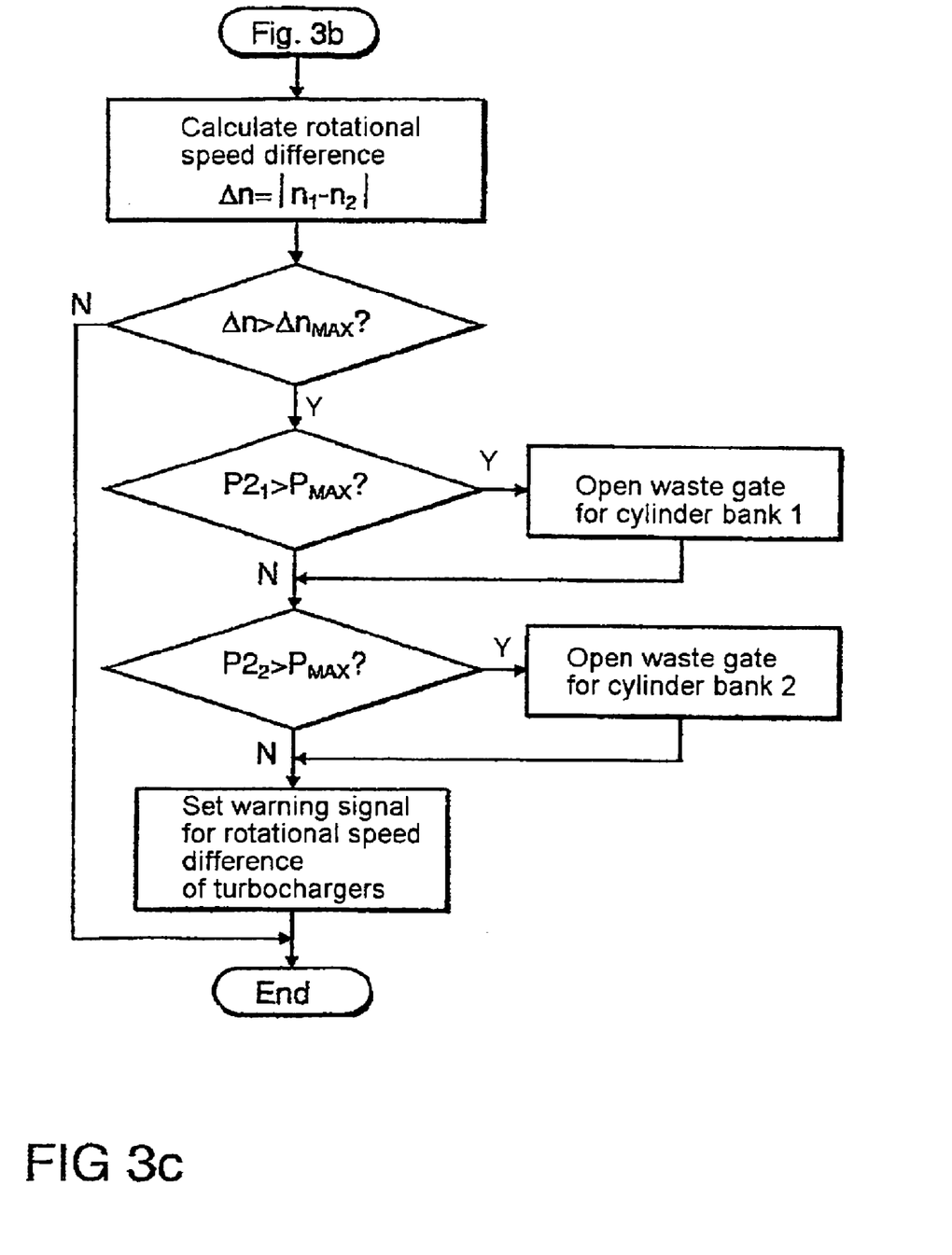

It can be seen from the control engineering equivalent circuit diagram in FIG. 2 that a subtractor 31 calculates the difference in rotational speed $\Delta\lambda_1$ between a predefined reference value $\lambda_{SOLL1}$ and the actual value $\lambda_1$ measured by the lambda probe 10.

The reference-actual value difference $\Delta\lambda_1$ is then fed to a regulator 32 which outputs a correcting variable $y_1$ depending on the reference-actual value difference $\Delta\lambda_1$ and uses the correcting variable $y_1$ to control the internal combustion engine 1 in order to regulate the reference-actual value difference $\Delta\lambda_1$.

In addition, the correcting variable $y_1$ is fed to a computing unit 33 which calculates the exhaust mass flow $MAF_1$ from the correcting variable $y_1$.

The computing unit 33 is connected to a further computing unit 34 which calculates the rotational speed $n_1$ of the exhaust gas turbocharger 8, whereby within the framework of a turbocharger rotational speed model the computing unit 34 takes into consideration the exhaust mass flow $MAF_1$, the pressure $P1_1$ upstream of the compressor 25, the pressure $P2_1$ downstream of the compressor 25 and also the temperature TIA measured by the temperature sensor 18.

The lambda regulation facility for the cylinder bank 2 of the internal combustion engine 1 has been described above.

Furthermore, a lambda regulation facility of the same type is also provided for the cylinder bank 3 of the internal combustion engine 1, as can be seen from the control engineering equivalent circuit diagram in FIG. 2 in the lower area. The lambda regulation facility for the cylinder bank 3 is constructed in the same way as the lambda regulation facility for the cylinder bank 2 so that no detailed description of the lambda regulation facility for the cylinder bank 3 is given in the following and the same reference characters are used in the following for corresponding components which are identified by means of an apostrophe simply for differentiation purposes.

The two computing units 34, 34' are connected on the output side to a comparator unit 35 which calculates the rotational speed difference $\Delta n$ from the two rotational speed values $n_1$, $n_2$.

The method according to the invention is now described in the following with reference to the flowchart shown in FIGS. 3a to 3c, whereby reference is made to the control engineering equivalent circuit diagram in FIG. 2 and also to the equipment shown in FIG. 1.

At the start of the method, the temperature TIA in the intake section of the internal combustion engine 1 is first measured by the temperature sensor 18. The temperature TIA is required both for calculating the rotational speed $n_1$ of the exhaust gas turbocharger 8 and also for calculating the rotational speed $n_2$ of the exhaust gas turbocharger 9 within the framework of a turbocharger rotational speed model, as will be described in detail.

Furthermore, the pressure $P1_1$ upstream of the compressor 25 of the exhaust gas turbocharger 8 is measured by the pressure sensor 29.

In addition, the pressure $P2_1$ downstream of the compressor 25 of the exhaust gas turbocharger 8 is measured by the pressure sensor 23.

The two pressure values $P1_1$ and $P2_1$ are likewise required within the framework of the turbocharger rotational speed model in order to ascertain the rotational speed $n_1$ of the exhaust gas turbocharger 8.

Furthermore, the air ratio $\lambda_1$ is measured by the lambda probe 10 in the exhaust section 4 of the cylinder bank 2 in order to subsequently calculate the reference-actual value difference $\Delta\lambda_1$.

Subsequently, the correcting variable $y_1$ is then ascertained, which is generated by the regulator 32 within the framework of the control engineering equivalent circuit diagram shown in FIG. 2 in order to correct the reference-actual value difference $\Delta\lambda_1$.

The computing unit 33 then ascertains the exhaust mass flow $MAF_1$ from the correcting variable $y_1$.

Within the framework of the turbocharger rotational speed model the rotational speed $n_1$ of the exhaust gas turbocharger 8 is then calculated from the exhaust mass flow $MAF_1$, the temperature TIA and also the pressure values $P1_1$ and $P2_1$.

The corresponding calculation of the rotational speed $n_2$ of the exhaust gas turbocharger 9 is now described in the following with reference to the method section shown in FIG. 3b.

In this situation also, the pressure $P1_2$ upstream of the compressor 26 and also the pressure $P2_2$ downstream of the compressor 26 are measured.

Furthermore, the air ratio $\lambda_2$ is measured in order to calculate the reference-actual value difference $\Delta\lambda_2$ from it.

The exhaust mass flow $MAF_2$ is then in turn calculated from the correcting variable $y_2$ required for correcting the reference-actual value difference $\Delta\lambda_2$.

In the manner described above for the cylinder bank 2 the rotational speed $n_2$ of the exhaust gas turbocharger 9 is then calculated for the cylinder bank 3 within the framework of a turbocharger rotational speed model, whereby the exhaust mass flow $MAF_2$, the temperature TIA, and also the pressure values $P1_2$ and $P2_2$ are taken into consideration.

In the method section shown in FIG. 3c, the rotational speed difference $\Delta n$ is then calculated from the previously ascertained rotational speed values n1, n2 and subsequently compared with a predefined maximum value $\Delta n_{MAX}$.

If the rotational speed difference $\Delta n$ does not exceed the predefined maximum value $\Delta n_{MAX}$, then there is no fault affecting either of the two exhaust gas turbochargers 8, 9 and the method is terminated.

If the rotational speed difference $\Delta n$ does exceed the predefined maximum value $\Delta n_{MAX}$, this indicates a fault affecting one of the two exhaust gas turbochargers 8, 9.

In this case the charging pressure $P2_1$ or $P2_2$ respectively is therefore compared with a predefined maximum value $P_{MAX}$ in order to be able to detect an excessive rise in the charging pressure.

If the charging pressure $P2_1$, $P2_2$ of one of the two exhaust gas turbochargers 8, 9 exceeds the associated maximum value $P_{MAX}$, then the associated bypass valve 15 or 16 respectively is at least partially opened in order to reduce the drive power of the affected exhaust gas turbocharger 8 or 9 respectively and to prevent an excessive rise in the charging pressure $P2_1$ or $P2_2$ respectively.

Furthermore, in such a case a warning signal is set which indicates an excessive rise in the rotational speed difference between the two exhaust gas turbochargers 8, 9 and which can be evaluated by the control unit 14.

The invention is not restricted to the preferred embodiment described above. Rather, a large number of variants and adaptations are possible which likewise make use of the concept of the invention and therefore come into the scope of the patent.

The invention claimed is:

1. A method for monitoring a rotational speed of a first and a second charger for an internal combustion engine, comprising:
    determining a first exhaust lambda value that represents an air ratio of the internal combustion engine associated with a first exhaust section;
    determining a first rotational speed value that represents the rotational speed of the first charger depending on the first exhaust lambda value determined;
    regulating the first exhaust lambda value to a predefined first reference value using a first correcting variable;
    determining the first correcting variable as required for regulation;
    determining the first rotational speed value depending on the first correcting variable,
    determining a second exhaust lambda value that represents an air ratio of the internal combustion engine associated with a second exhaust section of the engine;
    determining a second rotational speed value that represents a rotational speed of the second charger depending on the second exhaust lambda value determined; and
    comparing the first rotational speed value to the second rotational speed value in order to determine a rotational speed difference.

2. The method according to claim 1, comprising the additional steps:
    regulating the second exhaust value to a predefined second reference value using a second correcting variable;
    determining the second correcting variable as required for regulation; and
    determining the second rotational speed value depending on the second correcting variable.

3. The method according to claim 2, wherein an exhaust mass flow and/or an exhaust volume flow is derived from the first correcting variable and/or from a second correcting variable.

4. The method according to claim 3, wherein a bypass valve is controlled depending on the comparison between the first rotational speed value and the second rotational speed value in order to reduce the rotational speed difference between the first rotational speed value and the second rotational speed value.

5. The method according to claim 1, wherein the first charger and/or a second charger is an exhaust gas turbocharger.

6. A device for monitoring a rotational speed of a first and a second charger for an internal combustion engine, comprising:
    a first exhaust gas lambda sensor for measuring a first lambda value that represents an air ratio associated with a first exhaust section of the internal combustion engine;
    a first evaluation unit connected to the first exhaust gas lambda sensor for determining a first rotational speed value representing the rotational speed of the first charger depending on the first lambda value;
    a first regulator for regulating the first lambda value in the first exhaust section to a first reference value by setting a first correcting variable, the first regulator being connected to the first evaluation unit such that the first evaluation unit determines the first rotational speed value depending on the first correcting variable, a second exhaust gas lambda sensor for measuring a second lambda value that represents an air ratio associated with a second exhaust section of the internal combustion engine;

a second evaluation unit for determining a second rotational speed value that represents the rotational speed of a second charger depending on the second exhaust value; and a comparator unit for comparing the first rotational speed value to the second rotational speed value.

7. The device according to claim 6, further comprising a second regulator for regulating the second exhaust lambda value in the second exhaust section to a second reference value by setting a second correcting variable, the second regulator being connected to the second evaluation unit in order to determine the second rotational speed value depending on the second correcting variable.

8. The device according to claim 7, wherein an exhaust mass flow andlor an exhaust volume flow is determined from the first correcting variable and/or a second correcting variable.

9. The device according to claim 8, wherein at least one controllable bypass valve is provided for reducing a rotational speed difference between the first charger and a second charger whereby the comparator unit is connected to the bypass valve.

* * * * *